(12) United States Patent
Nojima

(10) Patent No.: US 7,050,279 B2
(45) Date of Patent: May 23, 2006

(54) METHOD AND APPARATUS FOR HIGH IMPEDANCE GROUNDING OF MEDIUM VOLTAGE AC DRIVES

(75) Inventor: Geraldo Nojima, Duluth, GA (US)

(73) Assignee: SMC Electrical Products, Inc., Huntington, WV (US)

( * ) Notice: Subject to any disclaimer, the term of this patent is extended or adjusted under 35 U.S.C. 154(b) by 534 days.

(21) Appl. No.: 10/404,646

(22) Filed: Apr. 2, 2003

(65) Prior Publication Data

US 2003/0197989 A1  Oct. 23, 2003

Related U.S. Application Data

(60) Provisional application No. 60/369,872, filed on Apr. 5, 2002.

(51) Int. Cl.
*H02H 3/00* (2006.01)

(52) U.S. Cl. ........................... 361/42; 361/47
(58) Field of Classification Search ............... 361/42, 361/47

See application file for complete search history.

(56) References Cited

U.S. PATENT DOCUMENTS

| | | | |
|---|---|---|---|
| 3,477,010 A * | 11/1969 | Nard | 363/43 |
| 4,542,432 A * | 9/1985 | Nichols et al. | 361/44 |
| 5,574,356 A | 11/1996 | Parker | |
| 5,576,942 A | 11/1996 | Beverly et al. | |
| 5,656,924 A | 8/1997 | Mohan et al. | |
| 5,790,356 A | 8/1998 | Bottrell et al. | |
| 6,028,405 A | 2/2000 | Kume et al. | |
| 6,154,378 A | 11/2000 | Peterson et al. | |
| 6,208,098 B1 | 3/2001 | Kume et al. | |
| 6,327,124 B1 | 12/2001 | Fearing et al. | |
| 6,421,594 B1 * | 7/2002 | Erasmus | 701/50 |
| 6,888,708 B1 * | 5/2005 | Brungs et al. | 361/42 |

* cited by examiner

*Primary Examiner*—Stephen W. Jackson
(74) *Attorney, Agent, or Firm*—Sughrue Mion, PLLC

(57) ABSTRACT

To protect people and equipment, three-phase AC drives need to be properly grounded, and ground faults need to be quickly detected. Conventional methods of detecting ground faults are affected by external factors that reduce their sensitivity. As an improvement on conventional methods, ground fault detection is accomplished by deriving a neutral point from the three-phase output of an AC drive, decoupling normal operating currents of the AC drive from the neutral point, resistively grounding the neutral point, and sensing when a magnitude of signals between the neutral point and ground exceed a maximum threshold level, ground faults are quickly detected. By effectively filtering normal operating currents from ground fault current, detection sensitivity is improved.

27 Claims, 9 Drawing Sheets

METHOD AND APPARATUS FOR HIGH IMPEDANCE GROUNDING OF MEDIUM VOLTAGE AC DRIVES

This application claims benefit of Provisional Application No. 60/369,872 filed Apr. 5, 2002; the disclosure of which is incorporated herein by reference.

BACKGROUND OF THE INVENTION

1. Field of the Invention

The present invention relates to the grounding of AC drives and the detection of ground faults.

2. Description of the Related Art

To protect people and equipment, AC motor drives and in particular medium voltage drives need to be properly grounded, and ground faults need to be immediately detected. Medium-voltage AC drives cover input line voltages above 660 VAC and up to 15,000 VAC.

"Neutral Point Inverter" is a topology conventionally used for medium voltage source inverters. Generally, grounding is through a neutral bus of the drive's inverter, the neutral point being directly or resistively grounded. An example of resistively grounding an AC drive through via the neutral bus of a three-level inverter is shown in FIG. 1. Ground faults are detected by measuring currents passing to ground via the grounding resistor connected to the neutral bus.

A drawback of conventional grounding solutions is that the motor cable leakage capacitance to ground may cause an increasingly higher ground current with an increase of motor cable length. In particular, common-mode currents, which are a normal byproduct of the PWM (pulse-width modulation) voltage pulses output by a multilevel inverter, are affected by changes to the motor cable.

During normal drive operation, the currents that flow are reactive currents, or displacement currents, or common-mode currents, that flow through the leakage capacitances involved. These "normal operating currents" flow as a consequence of the fast rate of rise of the output voltage and change their effective value with the AC drive output frequency. The common-mode currents are not used for detecting grounding faults. Instead, ground fault detection is performed by measuring "zero sequence currents.".

Zero sequence currents are in-phase components that occur when the balanced phase components are disturbed—like for instance in the occurrence of a ground fault. Ground fault detection is performed by measuring zero sequence currents through the neutral point to ground. When one of the three phases to the motor is shorted to ground, zero sequence currents flow through the neutral point to ground. Since zero sequence currents are all in-phase, they add up, rather than cancel. In comparison, the common-mode currents tend to cancel, but not completely, and can interfere in the measurement of the ground fault current which contain zero sequence components.

Common-mode currents are generated during the ordinary operation of PWM AC drives because of the pulse-width-modulated fast-changing-voltage edges of the AC drive output voltage. These common-mode currents are generated in the distributed capacitances of the motor cable and the motor itself, and are orthogonal with the zero sequence currents that may occur in a ground fault situation. The magnitude of common-mode currents are affected by a number of factors, including leakage capacitances of motor cables. The frequency of the common-mode currents is much higher than that of the motor current, which generally will top at 60 Hz. Typically, the common-mode currents will be 1,000 Hz and higher. In comparison the zero sequence currents have the same frequency as that of the motor.

When a ground fault occurs in a symmetrical three-phase system, the fault causes an asymmetry which can be broken down into three symmetrical components: a positive sequence, a negative sequence and a zero sequence. The positive sequence component has three vectors with equal magnitude and the same phase sequence as the original system. The negative sequence component also has three vectors with equal magnitude but with a phase sequence inverse to that of the original system. The zero sequence component has three vectors of the same magnitude which are in phase. Because the zero sequence current or voltage vectors are in phase, they add up at the neutral point. By measuring the zero sequence current or voltage component that results from the asymmetry caused by a ground fault situation, the ground fault can be detected. This method of breaking down an asymmetrical three phase system into three symmetrical components is called exactly that: "method of symmetrical components."

The input "utility" voltages to a PWM AC drive are sine waves with very little harmonic distortion. The highest dV/dt or rate of change of the input voltages is limited by the smooth shape of a sine wave. In the case of a 2,300V, 60 Hz, sine wave, the maximum dV/dt is less than 3V per microsecond and 4,160V, 60 Hz has less than 5V per microsecond dV/dt.

PWM AC drives convert the utility sine wave voltages into DC voltage and then chops this DC voltage in order to recreate an AC voltage with variable frequency. The resulting output voltage is a pulsating square-wave PWM wave form with fast rising/falling edges, very different from the smooth sine wave of the input utility voltages. The edges of the square wave pulses can have a dV/dt of 1,000V to 10,000V per microsecond, depending on the semiconductor technology used. That is thousands of times larger than the sine wave dV/dt.

The currents that flow in the leakage capacitances of the motor cables to ground obey the following differential equation:

$$i_g = C*(dV/dt)$$

where:

"$i_g$" is the ground current due to the wave form of the PWM AC drive flowing through the cable to ground and other locations in the inverter;

"C" is the coupling capacitance between the inverter output to ground;

"dV/dt" is the rate of change of the inverter output voltage pulses.

One can immediately see that a small "C" can cause increasing $i_g$ if dV/dt increases. The coupling capacitances are distributed in the output cables and also inside the inverter circuit like the IGBT and diode packages, etc. Thus, motor cable leakage causes increasingly higher ground currents with increasing cable length, resulting in higher currents being shunted to ground.

The Neutral Point Inverter topology approach has the disadvantage that the DC-link neutral point, when grounded solidly or via a grounding resistor, carries all of the common mode currents generated inside the AC drive itself, as well as currents created in the output cable to the motor. Measurement of ground fault currents becomes difficult, because differentiation between normal operating ground currents and ground fault currents is a moving target that depends on external operating conditions. As a result, sensitivity to ground fault currents is reduced, the protection afforded being thereby compromised.

Filtering the common-mode currents increases the accuracy and sensitivity to the detection of high impedance ground fault currents. A capacitor in parallel to the grounding resistor can be used to bypass the normal operating common-mode currents to ground, but the capacitance will be large and safety approval organizations—particularly mining approval agencies—will not allow such configurations, since there is no accounting for currents bypassed in this manner.

SUMMARY OF THE INVENTION

The present invention overcomes these limitations of the DC link neutral point approach, better differentiating between normal operating common-mode currents and zero sequence currents, thereby improving the protection of people and equipment. High-resistance ground fault protection is provided to AC drives, and in particular to medium- and high-voltage drives.

It is an object of the invention to improve the sensitivity of a fault detection system to zero-sequence currents.

It is a further object of the invention to derive a neutral point from the three-phase signals of the system being monitored for ground faults.

It is a further object of the invention to decouple the common-mode currents generated by PWM voltage pulses from the derived neutral point, while still capturing the sub-harmonic motor current content in case of a ground fault.

It is a further object of the invention to maintain a consistent sensitivity to ground faults without a need to tune the system after changes to drive-to-motor cable length.

It is a further object of the invention to dynamically adapt a ground-fault-threshold level based on motor speed.

It is a further object of the invention to maintain the integrity of the derived neutral point across the range of frequencies that are output by the drive during normal operation.

In accordance with these objects, an apparatus in accordance with the present invention comprises means for deriving a neutral point from the three-phase output of an AC drive, means for individually decoupling normal operating currents of each phase of the three-phase output of the AC drive from the neutral point, means for providing a signal path from the neutral point to ground, and means for detecting ground faults in the AC drive by sensing when a magnitude of signals between the neutral point and ground exceeds a maximum threshold level.

As a further expression of the invention, a method in accordance with the invention comprises deriving a neutral point from the three-phase output of an AC drive, individually decoupling normal operating currents of each phase of the three-phase output of the AC drive from the neutral point, resistively or directly grounding the neutral point, and detecting a ground fault in the AC drive by sensing when a magnitude of signals between the neutral point and ground exceed a maximum threshold level.

A method in accordance with a preferred embodiment of the invention comprises selecting resistances provided for windings of a three-phase transformer; providing the resistances to the transformer, either internally or externally; connecting the transformer to the three-phase output of the AC drive; determining capacitance for decoupling normal operating currents of the AC drive without causing distortion or lag in the zero-sequence currents during a ground fault; individually decoupling the normal operating currents of each phase of the three-phase output of the AC drive by individually filtering signals of each phase prior to the signals reaching the neutral terminal of the transformer by providing three capacitive paths to ground; resistively grounding the neutral terminal of the transformer; detecting a ground fault in the AC drive by sensing when a magnitude of current or voltage between the neutral terminal of the transformer and ground exceeds a threshold level; determining a rotational speed of a motor driven by the AC drive; adjusting the threshold voltage/current level indicating ground fault based on the rotational speed of the motor driven by the AC drive; and upon detecting a ground fault, signaling that a ground fault has occurred.

The invention can be used with any AC drive topology.

Other objects, advantages and capabilities of the invention will become apparent from the following description taken in conjunction with the accompanying drawings.

DETAILED DESCRIPTION OF THE PREFERRED EMBODIMENTS

Figure 1:
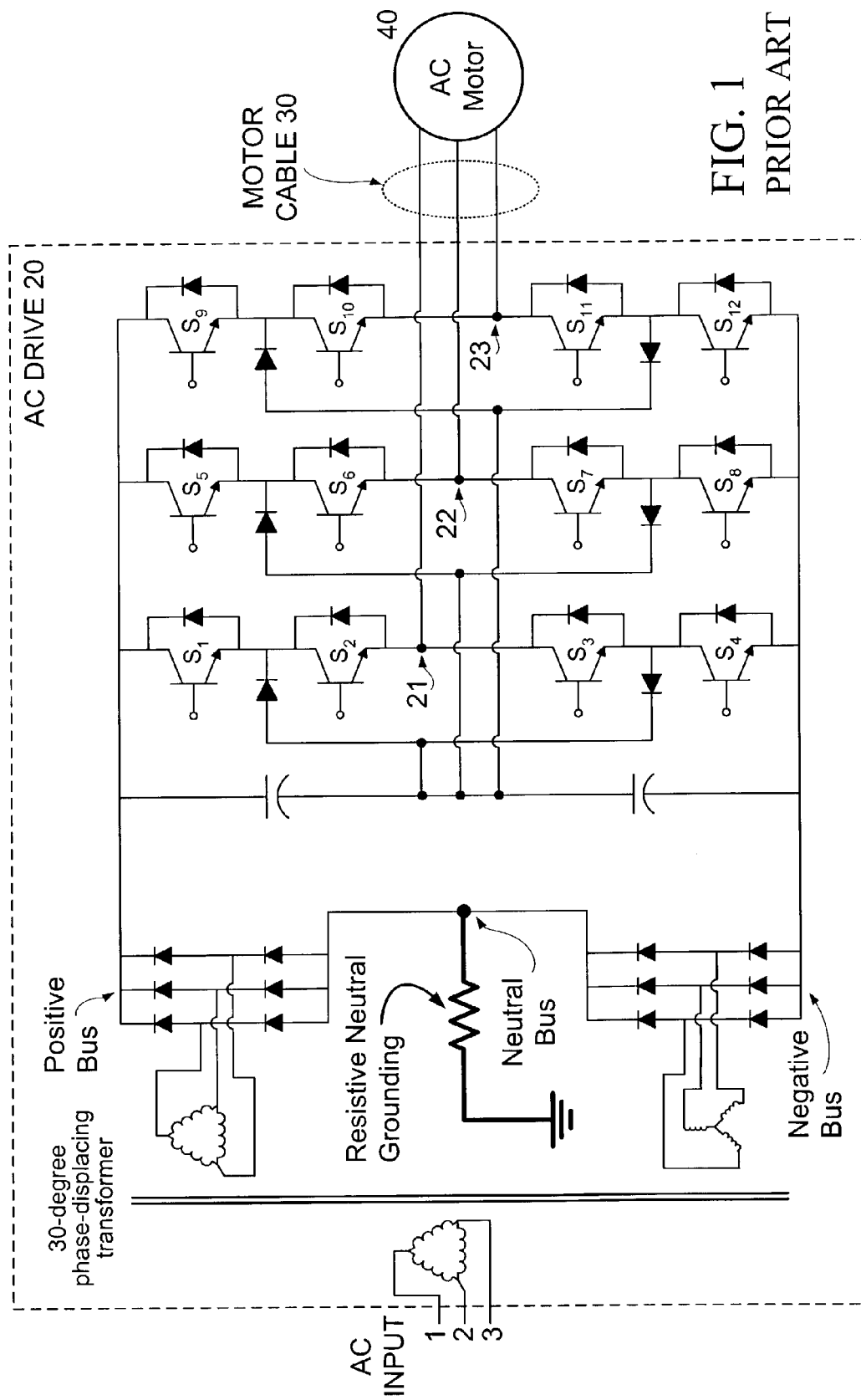
FIG. 1 illustrates a AC drive using the conventional neutral point inverter topology.
Figure 2:
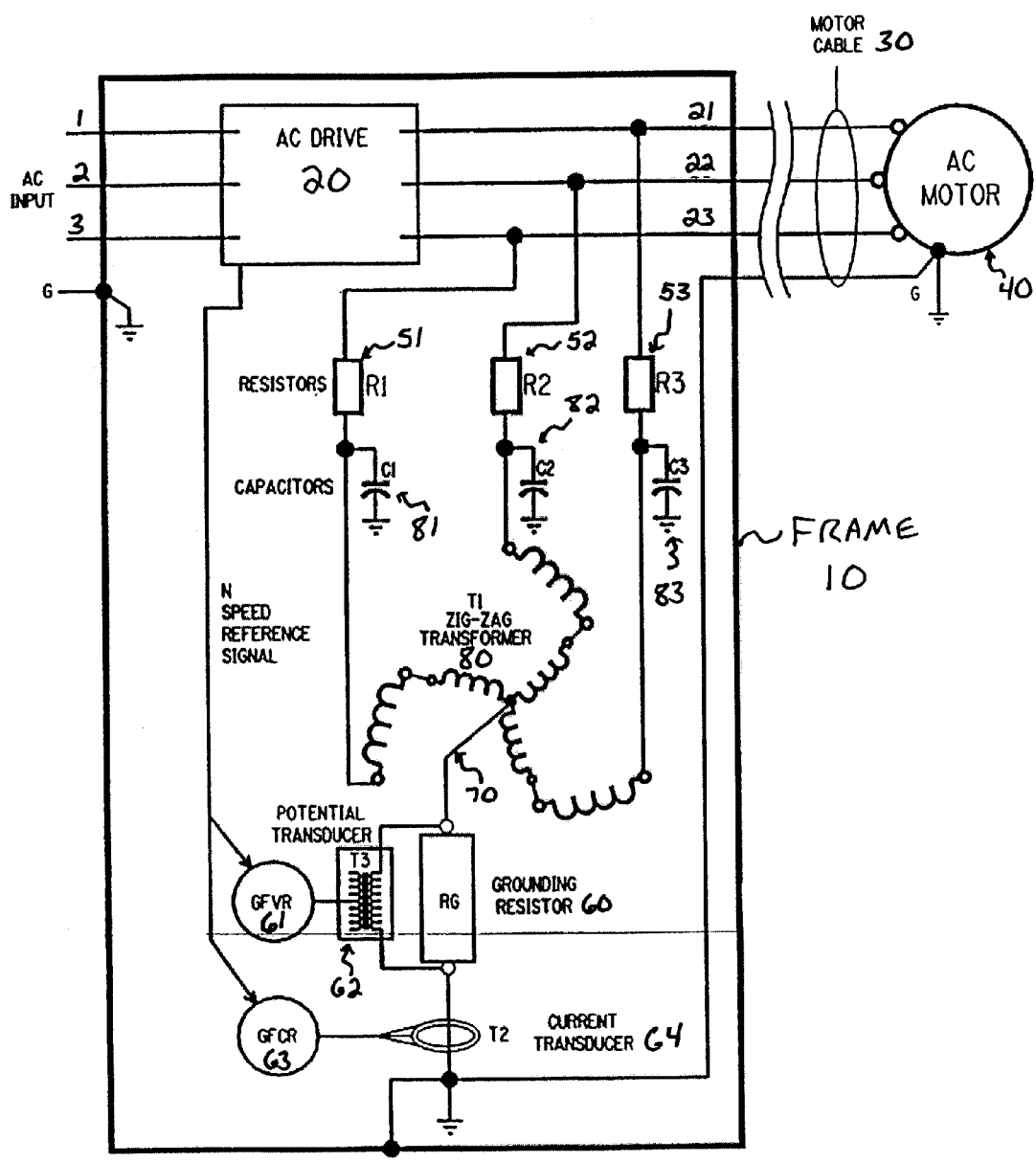
FIG. 2 illustrates a circuit implementing a preferred embodiment of the invention.

FIG. 2 illustrates a preferred embodiment of the invention. The neutral deriving network comprises a transformer T1 (80) and series resistors R1–R3 (51–53), creating an artificial neutral point (70) from the three outputs (21, 22, 23) of the AC drive (20). The derived neutral point (70) is stable, and is not load bearing.

A grounding resistor RG (60) is connected between the derived neutral point (70) and the system ground. Grounding resistor RG limits the current which flows to ground in the event of a short-circuit from any of the three AC drive output phases to ground. The resistance used for grounding resistor RG is application dependent, and has the objective of limiting the ground fault current to levels which are acceptable to a certain application and industry. For example, in the mining industry, there are applications which allow for a maximum current of 10 amperes, others that are limited to 0.5 amperes, and yet other, more stringent applications which allow for a maximum current of 125 milliamperes.

Any ground fault current is detected by a ground fault voltage relay (GFVR 61) and/or a ground fault current relay (GFCR 63) and the drive is turned off without a catastrophic ground fault current surge occurring. The frame (10) and AC motor (40) are also grounded.

The function of the transformer T1 is to create or derive a neutral point (70) from a three-wire or delta-connected three-phase system. This is a fairly common way to come up with a neutral point of a symmetrical multiphase voltage source with no neutral point at the source.

The resistors R1–R3, in series with the windings of transformer T1, protect the transformer T1 and the AC drive (20) when the three-phase output of the AC drive goes below the operating frequency for which the transformer was designed. This prevents the outputs of the AC drive from shorting to one another via the transformer windings, since the core of the transformer saturates at frequencies below the rated operating frequency. Resistors R1–R3 also limit the current through the grounding resistor RG.

The impedance of the transformer winding depends on its inductance and the frequency of the current flowing through it, or:

$$Z = 2 * \pi * f * L$$

where: "Z" is the transformer winding impedance; $\pi$ is 3.14159 . . . ; "f" is the current frequency; "L" is the transformer winding inductance.

The output frequency of the AC drive varies from zero (DC) to 60 hz or more. The transformer being submitted to this variable frequency will saturate, or loose its impedance, as the frequency goes below its rated value. In other words, at DC:

Z=zero because f=zero.

If only the transformer T1 (without resistors R1–R3) is connected to the AC drive outputs, when its windings' impedance goes down to zero, the outputs will be shorted. Accordingly, since the impedance of the resistors R1–R3 does not change with frequency, as happens with the transformer winding, the resistors R1–R3 provide a minimum impedance when the AC drive output frequency is approaches zero Hertz.

The resistance values of R1–R3 are calculated so that when a phase short-circuit to ground occurs, the current through the transformer and through the grounding resistor is limited to a maximum value desired. Preferably, a minimum resistance of resistors R1–R3 is the resistance necessary to limit the current through transformer T1, to the lower of (a) the maximum current the conductors used as windings in the transformer can withstand (e.g., maximum current before the conductors fail), and (b) the maximum current the output of the AC drive can withstand (e.g., maximum overload current before AC drive fails), if the transformer saturates.

As an alternative to resistors R1–R3, an equivalent resistance can be embedded into the transformer by winding the transformer with wire of the right size and resistance (e.g., embedding magnetic wire ohmic resistance into the T1 windings).

As with the motor cable (30), the PWM voltages output by the AC drive (20) cause common-mode currents to flow into the transformer T1 (80) because of coupling capacitances between its windings and the ground potential. These currents are filtered, or effectively filtered, by capacitors C1–C3 (81–83), which bypass the common-mode currents generated in the neutral deriving network to ground, while not affecting the ground fault current which has the same frequency as the motor current. Capacitors C1–C3 have small capacitance value and thus prevent any lags or distortion of the ground fault currents.

Capacitors C1–C3 are much smaller than the bypass capacitor used with the Neutral Point Inverter topology. The problem of accounting for bypassed current experienced with Neutral Point Inverter topology does not occur, because capacitor C1–C3 tune to the low-frequency zero-sequence components of the fault current, and because the impedance of the transformer rejects the high frequency components.

With the derived neutral point, whenever a phase-to-ground short circuit happens, zero sequence currents flow between the neutral point and ground. Because these currents are all in-phase, they add up. Because the RLC circuit (i.e., resistors R1–R3, transformer T1, capacitors C1–C3) filters the common mode currents that result from the pulsating nature of the AC drive output during normal operation, it allows the ground fault sensors to better differentiate between those currents and the zero sequence currents that happen during a phase short circuit to ground. Ground fault sensing can be either current-based (i.e., GFCR 63 and Transducer 64) or voltage-based (i.e., GFVR 61 and Transducer 62), but preferably both types of sensors are included as it provides better redundancy.

The current transducer T2 (64) and a GFCR (63) detect ground fault currents passing from the neutral point (70) to ground. When a current in excess to a set maximum threshold level passes through transducer T2, the GFCR will trip out, opening a normally open relay contact, thereby signaling to a control circuit that a ground fault has occurred. Although the GFCR can be normally open or normally closed, and can signal by either opening or closing, opening an normally open relay contact is the preferred configuration, since the GFCR will likely trip out in case of relay failure.

The transducer T2 should be able to detect pulsating DC and regular sine wave current, and should be able to couple DC currents without saturating. Because AC drives have a variable-frequency output voltage and current, the ground fault sensors used to monitor current and voltage can not saturate when the frequency is below 60 Hz, down to 0 Hz or DC. Some sensors are suitable for 50/60 Hz operation and may go down to 40 Hz, but ground fault sensors used with the present invention should be able to sense DC or 0 Hz signals as well as AC signals in order to monitor the AC drive outputs. Accordingly, transducer T2 should be able to sense DC or 0 Hz signals as well as AC signals in order to monitor the AC drive outputs. SMC's Relay SGF-25DC1 meets these requirements, and any equivalent relay may be used.

A potential transducer T3 (62) and a GFVR (61) detect ground faults based upon the voltage across the grounding resistor RG (60). When a voltage drop across the neutral grounding resistor RG exceeds a set maximum threshold voltage level, the drop is sensed through transducer T3. The GFVR will trip out, opening a normally open relay contact, thereby signaling to a control circuit that a ground fault has occurred. Although the GFVR can be normally open or normally closed, and can signal by either opening or closing, opening an normally open relay contact is the preferred configuration, since the GFVR will likely trip out in case of relay failure.

The transducer T3 should be able to detect pulsating DC voltage and sine wave voltages, and should be able to transform DC voltages without saturating. As discussed with regard to transducer T2, transducer T3 should be able to sense DC or 0 Hz voltage signals as well as AC signals in order to monitor the AC drive outputs.

When dealing AC drives, and in particular with medium- and high-voltage AC drives, the voltage levels may reach thousands of volts. Therefore, for reliable operation of the electronics controls, a potential transducer that can safely monitor those levels is required, providing electrical isolation from the high voltage source of the monitored signal.

Moreover, the potential transducer needs to be capable of monitoring variable frequency AC and DC voltages and have a reasonably fast dynamic response to the transients of the monitored voltage. A GFVR capable such variable frequency voltage signals and providing suitable isolation is SMC's Relay SGF-25DV1, and any equivalent device may be used.

Normally, such transducer will produce a small isolated output signal when the monitored voltage reaches a maximum set value. For example, when the monitored voltage is at 4000 VAC, the transducer output will read 4 VAC. The best voltage transducers nowadays are magnetically coupled and use hall effect devices.

Both of the ground fault relays (61, 63) utilize motor speed information "N" from the AC drive (20) in order to adapt to the variable output voltage. The motor speed information "N" is a signal available from most AC drive control circuits and is usually an isolated voltage signal or a discrete threshold-driven contact closures signal. The signal "N" simply reflects the actual motor shaft speed or the AC drive output frequency.

Motor shaft speed is directly related to the frequency of the applied voltage. AC drives vary the motor shaft speed by modifying the frequency and the amplitude of the three-phase output voltage. The torque of a motor can be defined as a ratio of volts per hertz, i.e., to maintain the motor torque constant the volts/hertz ratio has to be kept constant. For example, a 480 V 60 Hz motor requires a 480 V/60 Hz or 8V/Hz ratio in order to keep its magnetic flux constant, without saturation (larger V/Hz ratio) or starving (low V/Hz ratio). This means that when "N" changes the voltage amplitude also changes proportionally.

Because speed and voltage are changing in order to change the operating speed of an AC motor, the common-mode currents change and are inversely proportional to "N". More importantly, the ground fault current changes directly proportional to "N" because of the corresponding voltage change, or by Ohm's Law:

$$i=v/RG$$

where "i" is the current through the grounding resistor, "v" is the ground to neutral voltage and is directly proportional to the output voltage, and "RG" is the grounding resistor value.

The Ground Fault Current Relay (63) reads the "N" information and adapts the fault current threshold level accordingly. As the drive output voltage increases, so does the fault current threshold. Similarly, the Ground Fault Voltage Relay (61) reads the "N" information and adapts the fault voltage threshold level accordingly. As the drive output voltage increases, so does the fault voltage threshold.

For further background of ground fault relays, illustrating the state of the art, see U.S. Pat. No. 6,327,124, published Dec. 4, 2001, which is incorporated herein by reference.

Figure 3:
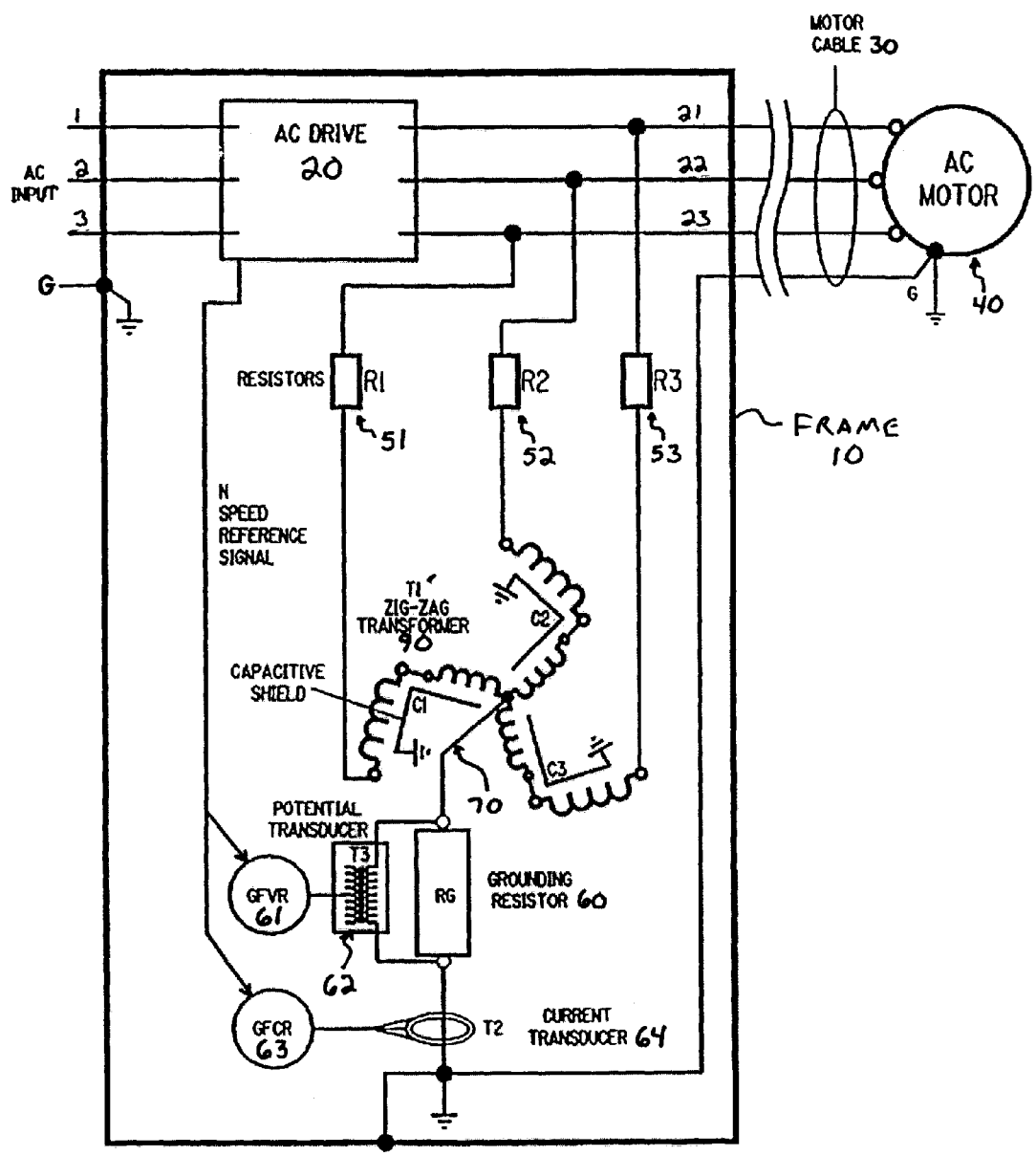
FIG. 3 illustrates a circuit implementing a further preferred embodiment of the invention.

A further preferred embodiment is illustrated in FIG. 3, which is the same as the embodiment in FIG. 2 as discussed above, except that the decoupling capacitors C1–C3 are embedded in transformer T1' (90). Placing the decoupling capacitors within transformer T1' is advantageous for minimizing component count and size. Embedding the capacitance is accomplished by selectively including a dielectric material between the windings of the transformer and a grounded plate or foil within the transformer. Preferably, the dielectric is a coating applied to a respective winding, and the grounded plate or foil is foil shielding that winding.

In FIGS. 2 and 3, the neutral deriving network uses a zigzag transformer. The zigzag transformer is preferred, as its use is widely accepted in industry, and in particular, by the regulatory agencies that rule on grounding and electrical hazard safety. Also, if the embodiment of FIG. 3 is used, the filter capacitance C1–C3 can be easily integrated into the construction of the zigzag transformer.

Figure 4:
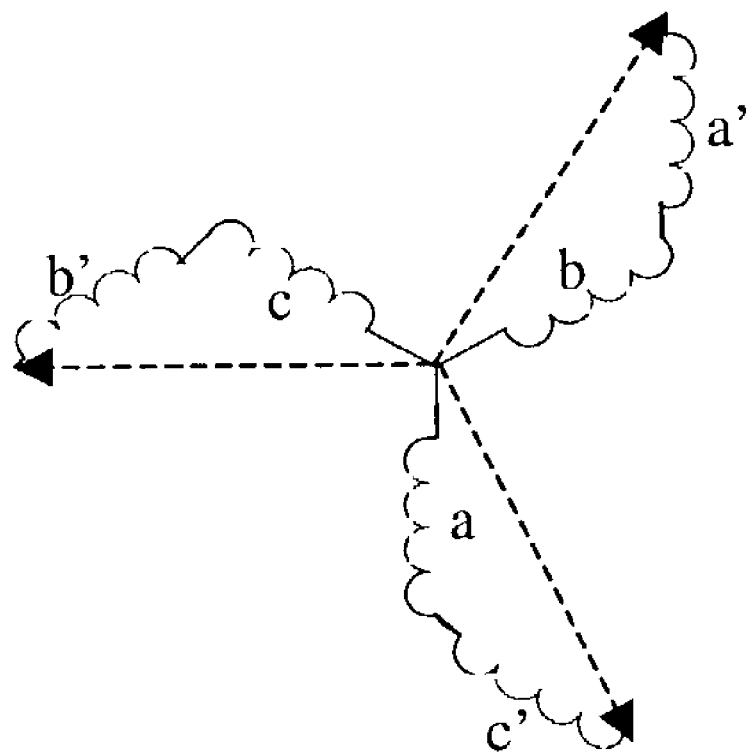
FIG. 4 illustrates the voltage vectors of a zigzag transformer.

Moreover, looking at FIG. 4, the dashed arrows are the resulting voltage vectors of a zigzag transformer. As shown, the voltage vectors are balanced and phase shifted by 120 degrees. Because each vector is the sum of the voltage of two different windings, whatever happens to one winding ends up affecting the resultant voltage vectors of the other phases. This happens because of the magnetic cross coupling within zigzag transformers. Windings a and a' are in phase because they are wound in the same leg of the transformer. The same is true for b and b', and c and c'. This advantageously allows the zigzag transformer to regulate the neutral potential and therefore allow neutral currents to be drawn, without causing voltage imbalance, up to the designed rating of the transformer.

Figure 5:
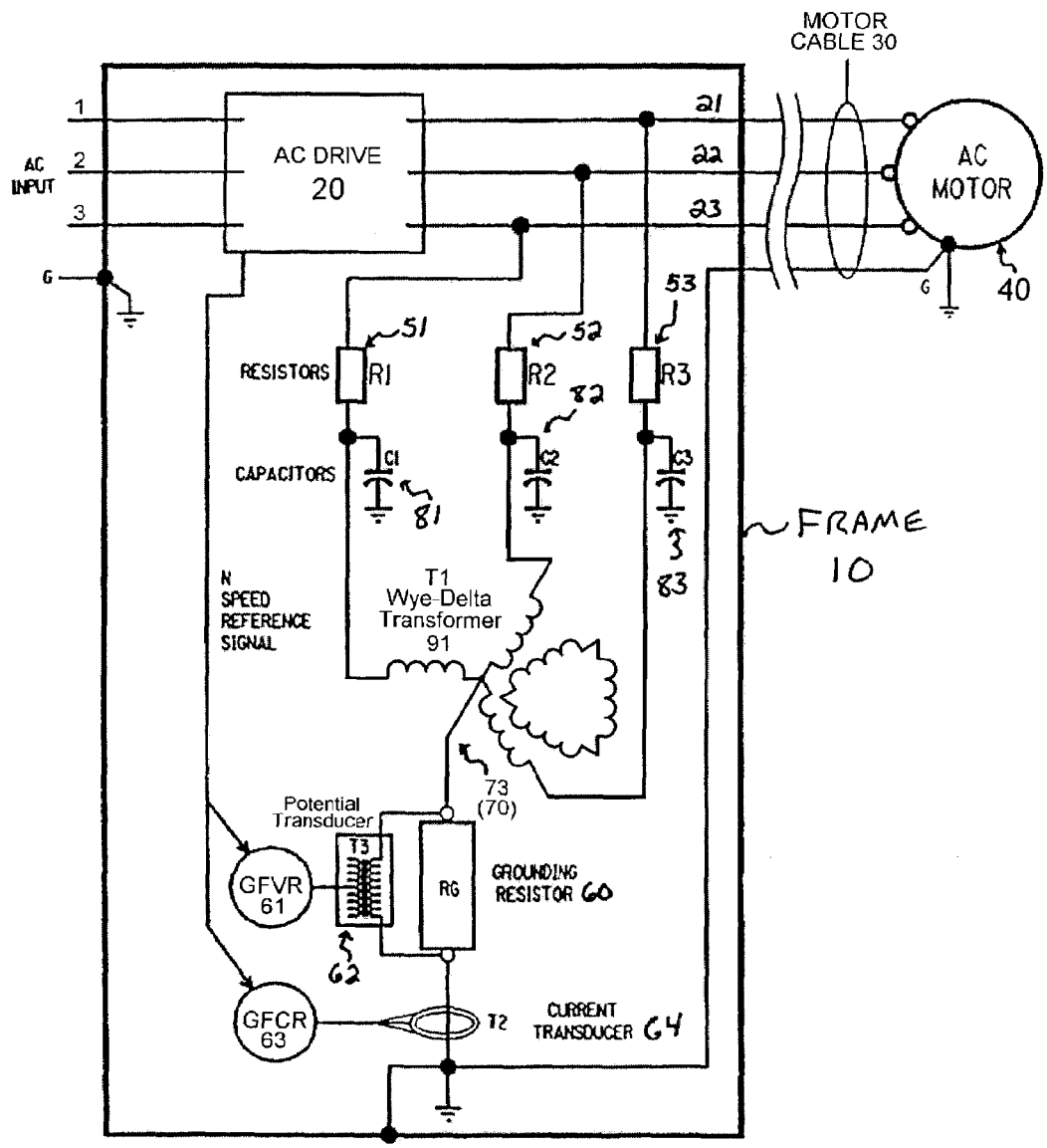
FIG. 5 illustrates an embodiment implementing the invention with a wye-delta transformer.

However, there are other ways to derive the neutral point. Another choice is a wye-delta transformer. As illustrated in FIG. 5, the wye-delta transformer (91) also provides a neutral point (73). Wye-delta transformers are also widely accepted in industry for deriving a neutral point out of a delta-connected three-phase system, and in this regard, function in the same way as a zigzag transformers.

Generally speaking, zigzag transformers are designed specifically targeting the generation and regulation of a neutral point. In comparison, wye-delta transformers are generally designed for supplying power to a certain rating and therefore may not be exactly suitable for certain neutral generating applications. Also, as typically constructed, wye-delta transformers have a higher impedance to zero-impedance currents than zigzag transformers. However, the neutral potential regulating effect of a wye-delta transformer is the same as that of the zigzag's, as explained above.

As in the discussion of zig-zag transformers, capacitance C1–C3 can be integrated into the wye-delta transformer (not illustrated). In such a case, it is preferable that at least the three windings tied to the neutral point (i.e., the windings forming the "wye") be provided with capacitance.

Figure 7:
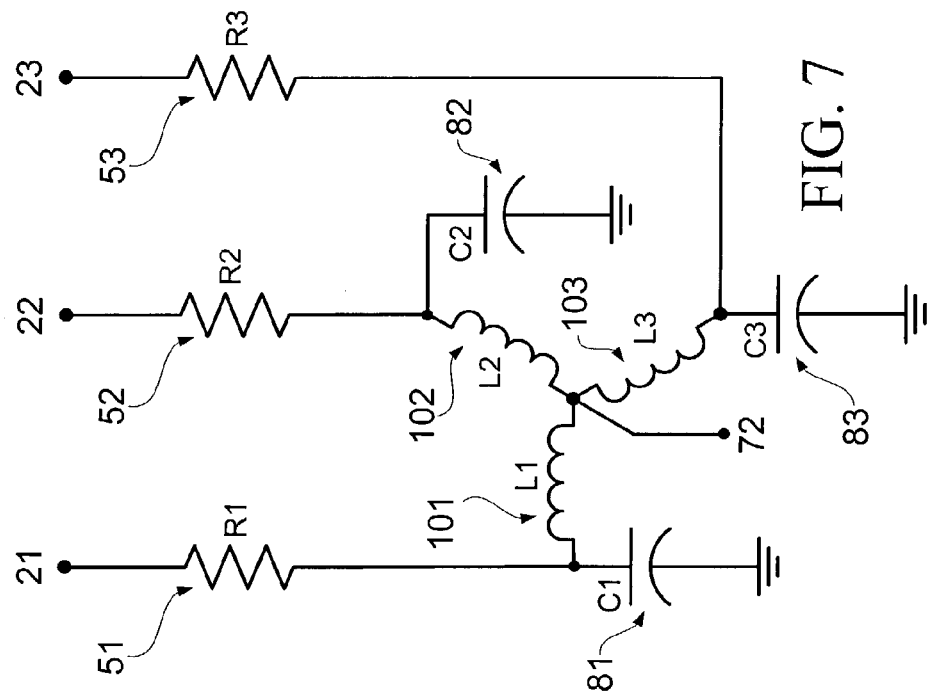
FIG. 7 illustrates a circuit for implementing the invention utilizing inductors in place of the transformer.
Figure 6:
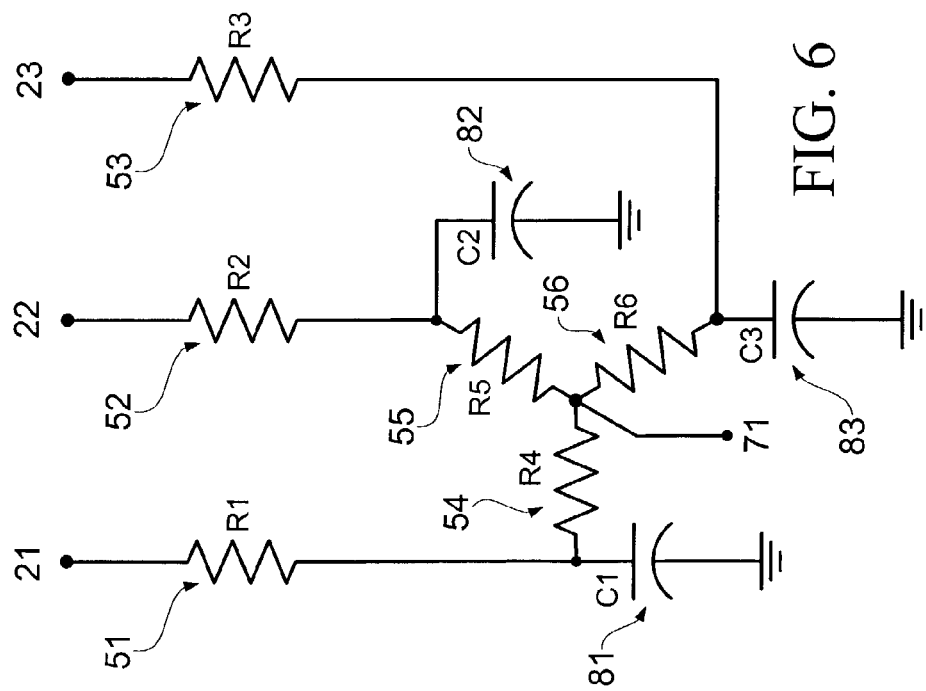
FIG. 6 illustrates a circuit for implementing the invention utilizing resistors in place of the transformer.

An artificial neutral point can also be derived without using a transformer. For example, by using either three inductors or three resistors as a substitute for the transformer. A resistor-based substitute is shown in FIG. 6, in which resistors R4–R6 (54–56) provide a neutral point (71). Each branch of the network has two resistors, creating a point for connecting capacitors C1–C3, and dividing the dissipated power between two resistors. Each resistor provides half the resistance per branch, although this proportion is not required, and some variation on the proportion between the two resistors will also work. A similar inductor-based solution is shown in FIG. 7, in which inductors L1–L3 (101–103) provide a neutral point (72).

The purely resistive or inductive network solutions do allow the creation of a neutral point for reference, and do suffice to reduce the ground fault currents in case of a short to ground, but do not provide regulation of the neutral potential. During normal operation, the AC drive circuit will keep the three-phase output voltages in balance, such that it does not require a transformer to regulate the neutral potential. However, under fault conditions, using a purely resistive or inductive network, the neutral point will become unstable as the neutral shifts due to the voltage imbalance.

Figure 8:
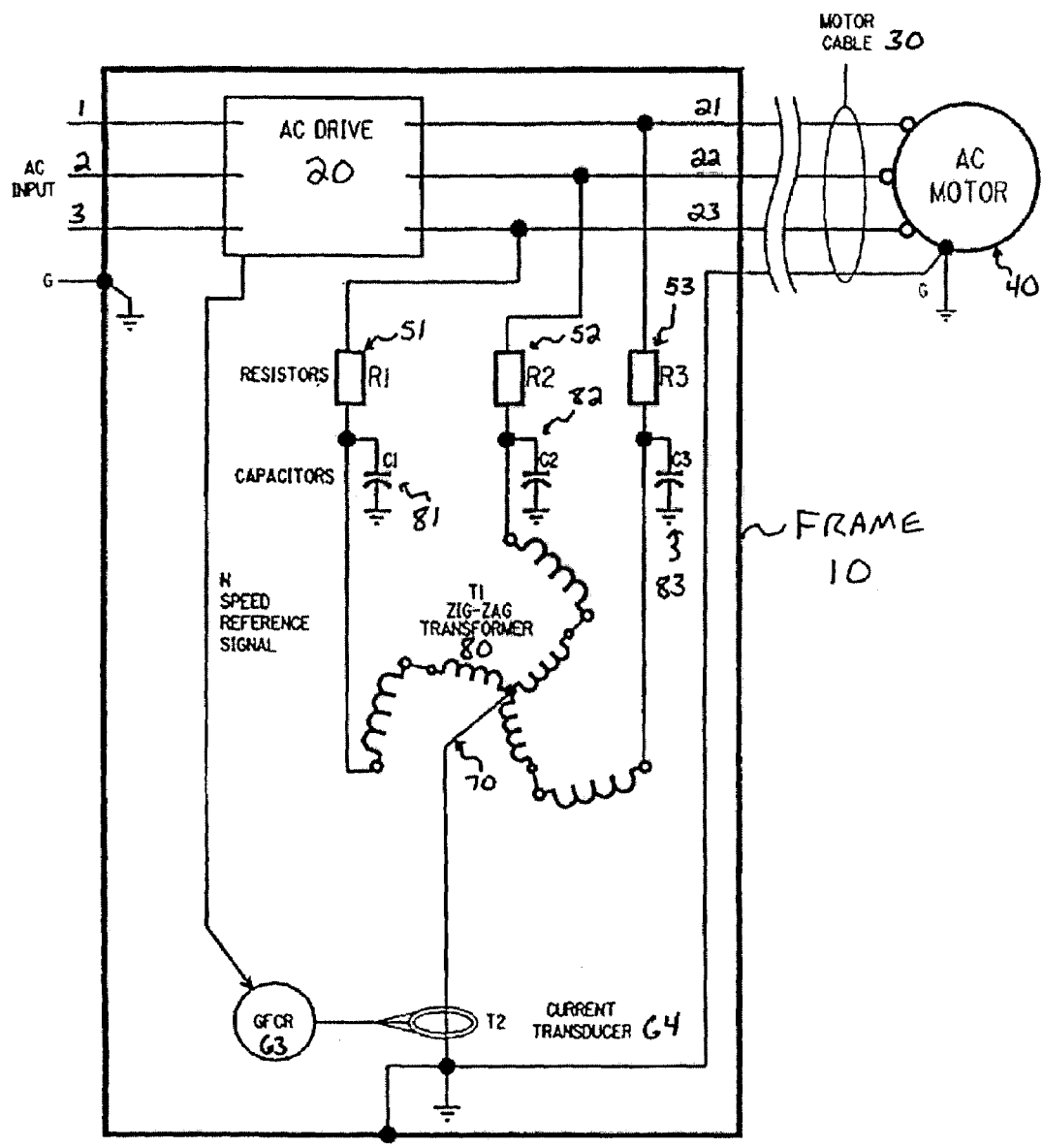
FIG. 8 illustrates an implementation of the invention utilizing direct grounding.

As a further embodiment of the invention, direct grounding can also be used, as exemplified in FIG. 8. The neutral point (74) is tied to ground by a conductor, and the GFCR and current transducer (63) is used to detect the ground fault current passing through the neutral point. In this case, resistors R1–R3 are responsible for limiting the current which flows to ground in the event of a short-circuit, in addition to protecting the AC drive (20) and the transformer during saturation. Although a zig-zag transformer (80) is illustrated, direct grounding can be utilized with the other neutral point deriving circuits.

When a transformer is utilized with the invention, it is preferably "inverter duty." As stated above, the AC drive output voltage is formed of pulses with variable duration which passing through an inductive load, produces a quasi-sinusoidal current. While the input utility voltage is sinusoidal and therefore has negligible dV/dt—less than 5V per microsecond in a 4,160V line—the AC drive output voltages have very fast edges and can cause reflected wave phenomena on the motor cables which end up causing a voltage increase by superposition of the reflected voltage waves, submitting the transformer or motor windings to higher voltages than their name plate voltages.

Common winding techniques used for purely sine wave voltage applications will not suffice for reliable operation with AC drives. There are various techniques that improve the reliability of transformers and motors windings which involve both how they are physically wound as well as the type and amount of insulation used. Transformers designed to withstand the rigors of inverter output voltage waveforms are referred to as "inverter duty." Winding and insulation techniques are used to minimize the corona effect damages, which may occur.

The corona effect is related to the ionization of gas particles around a conductor with high electrical potential. It causes the deterioration of the insulation materials whether they be the magnetic wire insulation material or the insulation in between windings. Another side effect of the corona effect is the smell of ozone gas in its proximity. The techniques for preventing corona damage are common knowledge of those who are skilled in the art, and are therefore omitted here. But for these reasons, an inverter duty transformer should be utilized.

Figure 9:
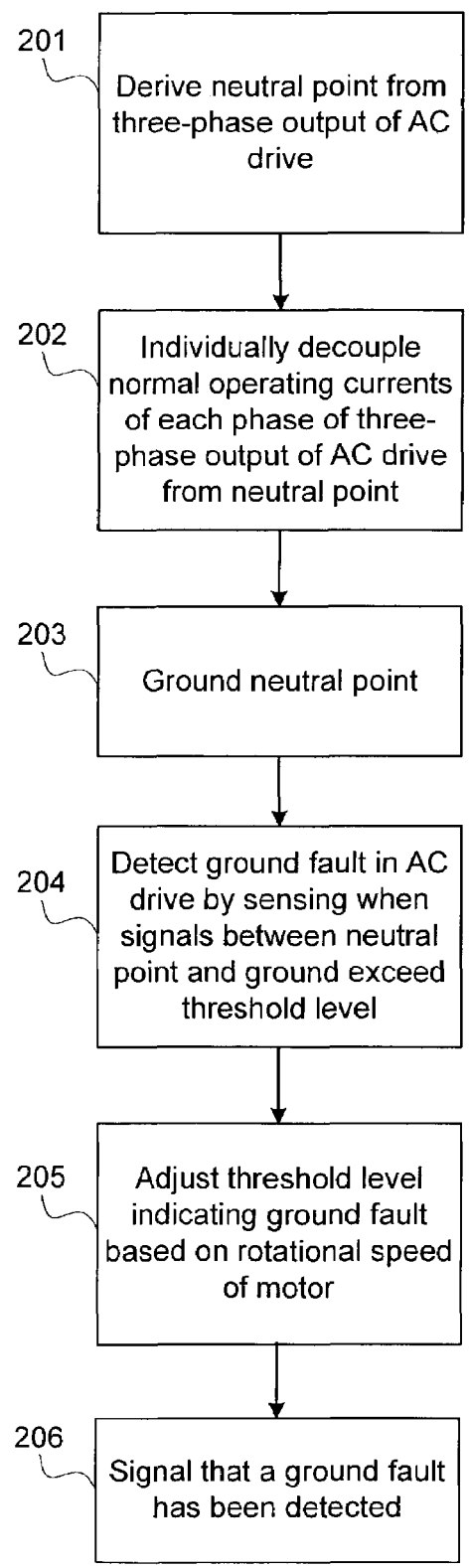
FIG. 9 illustrates a method for implementing the invention.

Based on the above embodiments, the invention can also be expressed as a method. Referring to FIG. 9, the method comprises deriving the neutral point from the three-phase output of the AC drive (201), individually decoupling the normal operating currents of each phase of the three-phase output from the neutral point (202), grounding the neutral point (203), detecting a ground fault in the AC drive by sensing when signals between the neutral point and ground exceed a maximum threshold level (204), adjusting the maximum threshold level indicating ground fault based on a rotational speed of a motor driven by the AC drive (205); and signaling when a ground fault has been detected.

Figure 10:
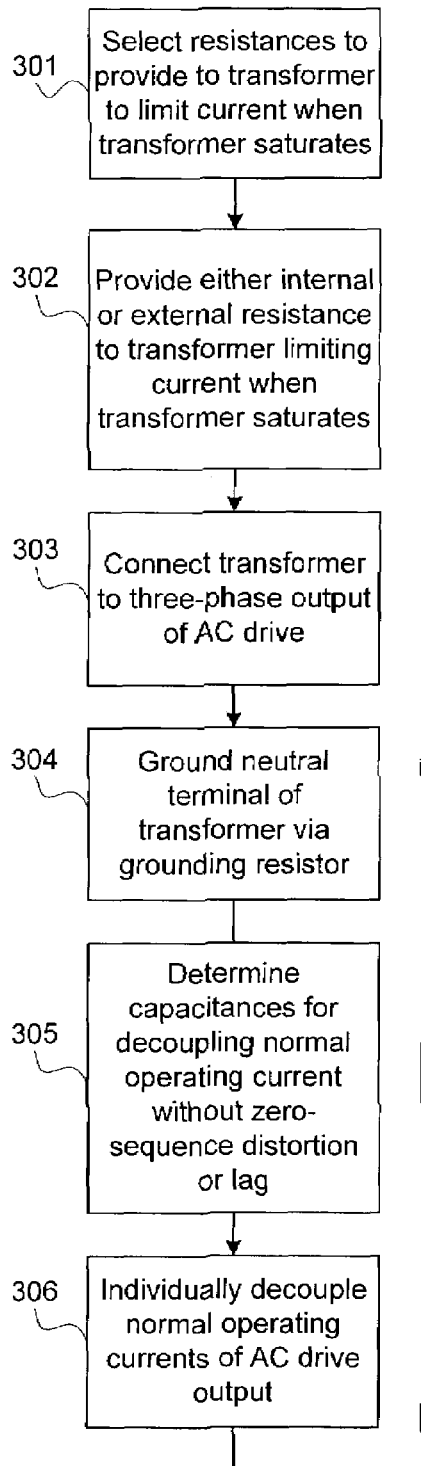
FIG. 10 illustrates a preferred embodiment of the method for implementing the invention.
Figure 10:
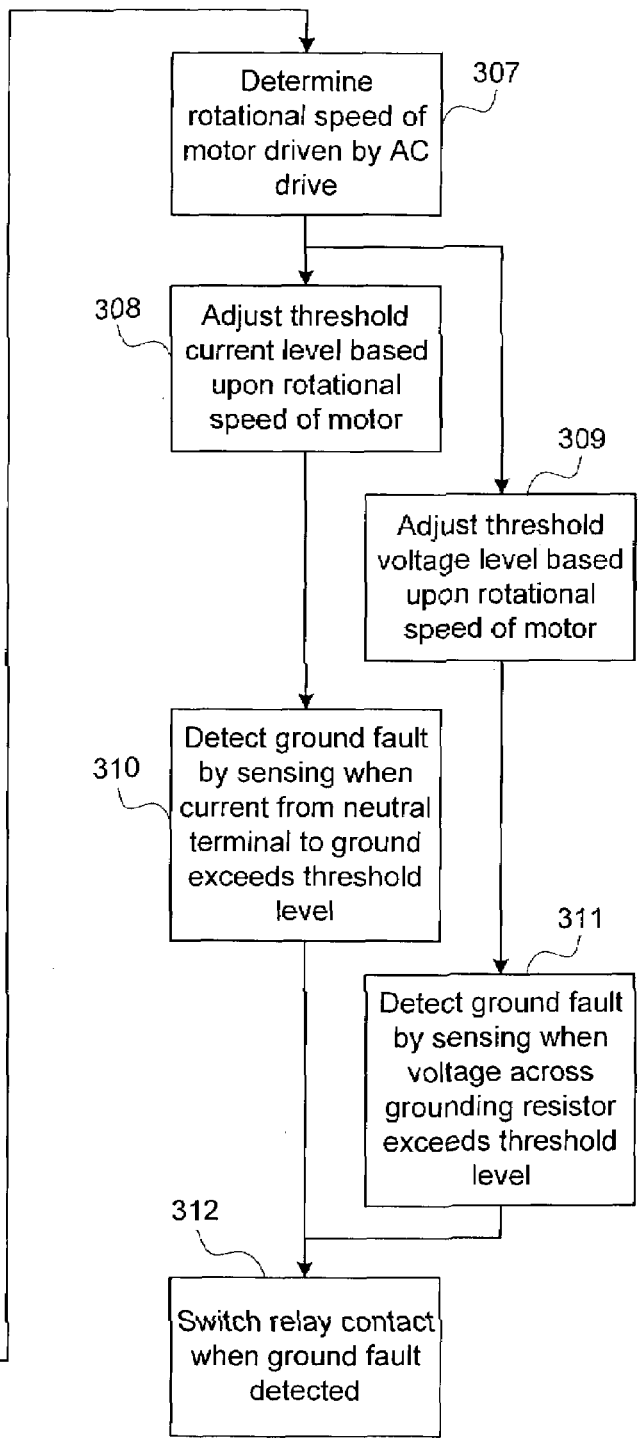

As a further expression of a method of performing the invention, FIG. 10 illustrates a method for performing a preferred embodiment using a transformer to derive the neutral point. The method comprises selecting resistance to provide to the transformer to limit current to no more than the maximum current the transformer and AC drive can withstand when the transformer saturates (301); providing that resistance, either internally or externally, to the transformer, thereby limiting the current levels during saturation (302); connecting the windings of the transformer to the output of the AC drive (303); grounding the neutral terminal of the transformer via a grounding resistor (304); determining capacitance for each capacitive path used to decouple the normal operating currents of the AC drive so that there is no distortion or lag in zero-sequence signals during a ground fault (305); individually decoupling the normal operating currents of each phase of the AC drive output from the neutral point by individually filtering signals of each phase of the three-phase output prior to the signals reaching the neutral point by providing the capacitive paths bypassing the neutral point to ground for the normal operating current (306); determining a rotational speed of a motor drive by the AC drive (307); adjusting a maximum threshold current level based upon the rotational speed of the motor(308); adjusting a maximum threshold voltage level based upon the rotational speed of the motor(309); detecting a ground fault by sensing when current from passing from the neutral point to ground exceeds the maximum current threshold level (310); detecting a ground fault by sensing when the voltage drop across the grounding resistor exceeds the maximum voltage threshold level (311); and signaling that a ground fault has occurred by switching, either open or closed, a relay contact (312).

In summation, the present invention provides enhanced ground-fault protection to AC motor drive systems. Unlike the DC Link Neutral Point approach, the invention is able to be applied to any drive-to-motor cable length without the need for further tuning. The invention makes this possible because it decouples the common-mode currents generated by the inverter output due to the PWM voltage pulses, which are in phase in all of the three outputs. The sub-harmonic content, though are phase shifted by 120 degrees like in any three-phase system. The invention works equally well with any three-phase drive system.

It is to be understood that the above-described embodiments and implementations are only illustrative of an application of the principles of the invention. Alternative arrangements are possible.

In addition to embedding at least some of the resistance in the transformer, or embedding the capacitance in the transformer, both the resistance (i.e., R1–R3) and capacitance (i.e., C1–C3) can be embedded into the transformer. Also, instead of using a speed reference signal "N" output from the AC drive, the ground fault relays can utilize rotational speed information determined by monitoring the motor. Also, instead of adaptively adjusting threshold sensitivity based on motor speed, a predetermined threshold can be used; however in such a case, greater demands are placed on the Ground Fault Relay for noise immunity and resistance to nuisance tripping.

Accordingly, it is contemplated that numerous modifications may be made to the embodiments and implementations of the present invention without departing from the spirit and scope of the invention as defined in the following claims.

What is claimed is:

1. An apparatus for grounding an AC drive having a three-phase output, comprising:

deriving means for deriving a neutral point from the three-phase output of the AC drive;

decoupling means for individually decoupling normal operating currents of each phase of the three-phase output of the AC drive from the neutral point;

grounding means for providing a signal path from the neutral point to ground; and ground fault sensing means for detecting ground faults in the AC drive by sensing when a magnitude of zero-sequence signals between the neutral point and ground exceed a maximum threshold level.

2. The apparatus of claim 1, said deriving means comprising:
   a 3-phase transformer having three input terminals, a neutral terminal, and at least three windings, wherein each input terminal corresponds to one-of-three phases and the neutral terminal provides said neutral point; and
   for each of the three phases, resistance respectively provided in series between an output of the three-phase output of the AC drive and an input terminal of the three input terminals of the 3-phase transformer;
   wherein said resistance is at least that required to limit current through the 3-phase transformer to a maximum current that the 3-phase transformer can withstand when the 3-phase transformer saturates.

3. The apparatus of claim 2, said decoupling means comprising:
   for each of the three phases, capacitance provided in series between an input terminal of said three input terminals of the 3-phase transformer and ground,
   wherein said capacitance does not distort or cause lags in the zero-sequence signals.

4. The apparatus of claim 2, said decoupling means comprising:
   for each of the three phases, capacitance embedded in the 3-phase transformer between a winding and ground,
   wherein said capacitance does not distort or cause lags in the zero-sequence signals.

5. The apparatus of claim 1, said deriving means comprising:
   a 3-phase transformer having three input terminals, a neutral terminal, and at least three windings, wherein each input terminal corresponds to one-of-three phases and the neutral terminal provides said neutral point; and
   for each of the three phases, resistance respectively provided in series between an output of the three-phase output of the AC drive and an input terminal of the three input terminals of the 3-phase transformer;
   wherein said resistance is at least that required to limit current to a maximum overload output current that the AC drive can withstand when the 3-phase transformer saturates.

6. The apparatus of claim 5, said decoupling means comprising:
   for each of the three phases, capacitance provided in series between an input terminal of said three input terminals of the 3-phase transformer and ground,
   wherein said capacitance does not distort or cause lags in the zero-sequence signals.

7. The apparatus of claim 5, said decoupling means comprising:
   for each of the three phases, capacitance embedded in the 3-phase transformer between a winding and ground,
   wherein said capacitance does not distort or cause lags in the zero-sequence signals.

8. The apparatus of claim 1, wherein said ground fault sensing means adjusts the maximum threshold level indicating a ground fault based on a rotational speed of a motor driven by the AC drive.

9. The apparatus of claim 1, said grounding means comprising a conductor connected between the neutral point and ground.

10. The apparatus of claim 1, said grounding means comprising a grounding resistor connected in series between the neutral point and ground.

11. The apparatus of claim 10, said ground fault sensing means comprising:
    a potential transducer measuring voltage signals across the grounding resistor, and communicating a magnitude of voltage measured across the grounding resistor to a ground fault voltage relay; and
    the ground fault voltage relay, detecting that a ground fault has occurred in the AC drive when the magnitude of voltage across the grounding resistor exceeds the maximum threshold level.

12. The apparatus of claim 11, wherein upon detecting a ground fault, the ground fault voltage relay opens or closes a relay contact, thereby signaling that a ground fault has occurred.

13. The apparatus of claim 1, said ground fault sensing means comprising:
    a current transducer coupled to the signal path from the neutral point to ground, and communicating to a ground fault current relay a magnitude of current passing through the signal path from the neutral point to ground; and
    the ground fault current relay, detecting that a ground fault has occurred in the AC drive when the magnitude of current passing through the signal path from the neutral point to ground exceeds the maximum threshold level.

14. The apparatus of claim 13, wherein upon detecting a ground fault, the ground fault current relay opens or closes a relay contact, thereby signaling that a ground fault has occurred.

15. The apparatus of claim 1, said deriving means comprising a 3-phase transformer having three input terminals, a neutral terminal, and at least three windings, and having resistance embedded in at least a winding of each respective phase; and
    said decoupling means comprising, for each of the three phases, capacitance embedded in the 3-phase transformer between a winding and ground,
    wherein each input terminal corresponds to one-of-three phases and the neutral terminal provides said neutral point,
    wherein the embedded resistance is at least that required to limit current through the 3-phase transformer to a maximum current that the 3-phase transformer can withstand when the 3-phase transformer saturates, and
    wherein said capacitance does not distort or cause lags in the zero-sequence signals.

16. The apparatus of claim 1, said deriving means comprising a 3-phase transformer having three input terminals, a neutral terminal, and at least three windings, and having resistance embedded in at least a winding of each respective phase; and
    said decoupling means comprising, for each of the three phases, capacitance embedded in the 3-phase transformer between a winding and ground,
    wherein each input terminal corresponds to one-of-three phases and the neutral terminal provides said neutral point,
    wherein the embedded resistance is at least that required to limit current to a maximum overload output current that the AC drive can withstand when the 3-phase transformer saturates, and
    wherein said capacitance does not distort or cause lags in the zero-sequence signals.

17. The apparatus of claim 1, said deriving means comprising, for each of the three phases, a pair of resistors connected in series between an output of the three-phase output of the AC drive and said neutral point; and said decoupling means comprising, for each of the three phases, capacitance provided in series from between the pair of resistors to ground, wherein said capacitance does not distort or cause lags in the zero-sequence signals.

18. The apparatus of claim 1, said deriving means comprising, for each of the three phases, a resistor and an inductor in series between an output of the three-phase output of the AC drive and said neutral point, the respective resistor being connected to the output of the AC drive and the respective inductor being connected to the neutral point; and said decoupling means comprising for each of the three phases, capacitance provided in series from between the resistor and inductor to ground, wherein said capacitance does not distort or cause lags in the zero-sequence signals.

19. A method of grounding an AC drive having a three-phase output, comprising:

deriving a neutral point from the three-phase output of the AC drive;

individually decoupling normal operating currents of each phase of the three-phase output of the AC drive from the neutral point;

resistively or directly grounding the neutral point; and detecting a ground fault in the AC drive by sensing when a magnitude of zero-sequence signals between the neutral point and ground exceed a maximum threshold level.

20. The method of claim 19, further comprising:

determining a rotational speed of a motor driven by the AC drive;

adjusting the maximum threshold level indicating ground fault based on the rotational speed of the motor driven by the AC drive.

21. The method of claim 19, further comprising:

upon detecting a ground fault, signaling that a ground fault has occurred.

22. The method of claim 21, wherein said signaling that a ground fault has occurred comprises opening or closing a relay contact.

23. The method of claim 19, wherein the deriving the neutral point comprises:

connecting three input terminals of a 3-phase transformer to the three-phase output of the AC drive via resistance, a neutral terminal of the 3-phase transformer providing said neutral point; and determining said resistance so that current is limited through the 3-phase transformer to a maximum current that the 3-phase transformer can withstand when the 3-phase transformer saturates.

24. The method of claim 19, wherein the deriving the neutral point comprises:

connecting three input terminals of a 3-phase transformer to the three-phase output of the AC drive via resistance, a neutral terminal of the 3-phase transformer providing said neutral point; and determining said resistance so that current is limited to a maximum overload output current that the AC drive can withstand when the 3-phase transformer saturates.

25. The method of claim 19, wherein the deriving the neutral point comprises:

providing resistance to at least a winding of each phase of a 3-phase transformer;

connecting three input terminals of the 3-phase transformer to the three-phase output of the AC drive, a neutral terminal of the 3-phase transformer providing said neutral point; and determining said resistance so that current is limited through the 3-phase transformer to a maximum current that the 3-phase transformer can withstand when the 3-phase transformer saturates.

26. The method of claim 19, wherein the deriving the neutral point comprises:

providing resistance to at least a winding of each phase of a 3-phase transformer;

connecting three input terminals of the 3-phase transformer to the three-phase output of the AC drive, a neutral terminal of the 3-phase transformer providing said neutral point; and determining said resistance so that current is limited to a maximum overload output current that the AC drive can withstand when the 3-phase transformer saturates.

27. The method of claim 19, wherein individually decoupling the normal operating currents of each phase comprises:

individually filtering signals of each phase of the three-phase output prior to the signals reaching the neutral point by providing a capacitive paths to ground for each phase; and determining the capacitance for each capacitive path so that there is no distortion or lag caused in the zero-sequence signals.

* * * * *